(12) United States Patent
Kawai et al.

(10) Patent No.: US 7,041,328 B2
(45) Date of Patent: *May 9, 2006

(54) ACID OIL-IN-WATER EMULSIFIED COMPOSITION

(75) Inventors: Shigeru Kawai, Toyko (JP); Yoshihiro Konishi, Wakayama (JP)

(73) Assignee: Kao Corporation, Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 10/459,512

(22) Filed: Jun. 12, 2003

(65) Prior Publication Data

US 2003/0215545 A1 Nov. 20, 2003

Related U.S. Application Data

(63) Continuation of application No. 09/926,741, filed as application No. PCT/JP00/03763 on Jun. 9, 2000, now Pat. No. 6,635,777.

(30) Foreign Application Priority Data

Jun. 17, 1999 (JP) ................... 11-170849

(51) Int. Cl.
A23D 7/01 (2006.01)
C07C 53/00 (2006.01)
C07C 57/00 (2006.01)

(52) U.S. Cl. ............ 426/605; 426/613; 426/602; 554/227

(58) Field of Classification Search ......... 426/601, 426/605, 613
See application file for complete search history.

(56) References Cited

U.S. PATENT DOCUMENTS

| | | | |
|---|---|---|---|
| 4,034,124 A | | 7/1977 | Van Dam |
| 4,119,564 A | | 10/1978 | Van Dam |
| 4,280,996 A | * | 7/1981 | Okamoto et al. ............. 514/78 |
| 4,451,493 A | * | 5/1984 | Miller et al. ................ 426/602 |
| 4,857,236 A | * | 8/1989 | Gunther ........................ 554/21 |
| 5,153,125 A | * | 10/1992 | Kobayashi ................... 435/128 |
| 5,160,759 A | | 11/1992 | Nomura et al. |
| 5,314,706 A | * | 5/1994 | Colarow et al. ............. 426/605 |
| 5,597,602 A | * | 1/1997 | Peter et al. .................. 426/478 |
| 5,690,986 A | * | 11/1997 | Okutomi et al. ............ 426/604 |
| 5,958,498 A | * | 9/1999 | Trueck et al. ............... 426/605 |
| 6,139,897 A | * | 10/2000 | Goto et al. .................. 426/601 |
| 6,287,624 B1 | * | 9/2001 | Mori et al. .................. 426/601 |
| 6,326,050 B1 | * | 12/2001 | Goto et al. .................. 426/601 |
| 6,337,414 B1 | | 1/2002 | Sugiura et al. |
| 6,635,777 B1 | * | 10/2003 | Kawai et al. ................ 554/227 |

FOREIGN PATENT DOCUMENTS

| | | |
|---|---|---|
| EP | 0 378 893 | 7/1990 |
| EP | 0 402 090 | 12/1990 |
| EP | 0 417 562 | 3/1991 |
| EP | 0 425 958 | 5/1991 |
| EP | 0 990 391 | 4/2000 |
| JP | 53-44426 | 11/1978 |
| JP | 55-42817 | 11/1980 |
| JP | 62-262998 | * 11/1987 |
| JP | 3-8431 | 1/1991 |
| JP | 02 291228 | 2/1991 |
| JP | 04 079858 | 3/1992 |
| JP | 05 146270 | 6/1993 |
| JP | 6-22461 | 3/1994 |
| WO | WO 01/01787 | 1/2001 |
| WO | WO 01/15542 | 3/2001 |

OTHER PUBLICATIONS

Lowe, B. 1937. Experimental Cookery, 2nd ed., John Wiley & Sons, Inc., p. 269, 271.*

C.E. Dutilh, et al., J. Sci. Food Agric., vol. 32, pp. 451-458, "Improvement of Product Attributes of Mayonnaise by Enzymic Hydrolysis of Egg Yolk with Phospholipase $A_2$", 1981.

* cited by examiner

*Primary Examiner*—Carolyn Paden
(74) *Attorney, Agent, or Firm*—Oblon, Spivak, McClelland, Maier & Neustadt, P.C.

(57) ABSTRACT

Described is an acid oil-in-water emulsified composition comprising an oil phase having a diglycerides content of 30 wt. % or greater and a yolk, wherein a ratio of lysophospholipids to the whole phospholipids is at least 15% in terms of a phosphorus amount. The composition has excellent storage stability, appearance, taste and physical properties even if it contains diglycerides in a high concentration without decreasing the amount of the yolk.

22 Claims, No Drawings

ACID OIL-IN-WATER EMULSIFIED COMPOSITION

This application is a continuation of U.S. Ser. No. 09/926,741, filed Dec. 11, 2001, now U.S. Pat. No. 6,635,777, which is a 371 of PCT/JP00/03763, filed Jun. 9, 2000.

TECHNICAL FIELD

The present invention relates to an acid oil-in-water emulsified composition which is particularly suited as mayonnaise or dressing type products.

BACKGROUND ART

In recent years, since it has become clear (Japanese Patent Application Laid-Open No. HEI 4-300828) that diglycerides have obesity preventive action or weight gain inhibitory action, there has been an attempt to add them to various foods. In addition, it is reported (JP 2848849) that use of a glyceride mixture containing a high concentration of diglycerides as an oil phase makes it possible to provide an edible oil-in-water emulsified composition which has rich fat feeling and good taste even at a reduced fat content.

To an acid oil-in-water emulsified composition such as a mayonnaise or emulsified dressing containing mayonnaise, a yolk is usually added in an amount of 0.5 to 20 wt. % (which will hereinafter be called "%" simply) as an emulsifying agent or for the purpose of taste improvement.

The present inventors therefore prepared an acid oil-in-water emulsified composition by emulsifying, with a yolk, an oil phase containing diglycerides in a high concentration.

It was however revealed that the mayonnaise prepared as described above had a markedly lowered commodity value because cracks appeared during storage, water separated from the cracks oozed out, it had a gloss-free and texture-roughened appearance and it exhibited gel-like physical properties. Such phenomena do not occur in a commercially available mayonnaise containing triglycerides as an oil phase and they have been serious hindrances to the incorporation of diglycerides in a high concentration (at least about 30%). When the amount of a yolk was decreased with a view to overcoming such problems, cracks did not appear but stable emulsification was not attained and the resulting mayonnaise became poor in a yolk taste.

An object of the present invention is therefore to provide an acid oil-in-water emulsified composition which has, even if it contains diglycerides in a high concentration and the amount of a yolk is not reduced, excellent storage stability, for example, is free from cracks during storage, and at the same time, has gloss, appearance of fine texture, excellent taste and cream-like physical properties.

DISCLOSURE OF THE INVENTION

The present inventors have found, contrary to their expectation, that an acid oil-in-water emulsified composition having excellent storage stability, appearance, taste and physical properties can be obtained even if it has a high content of a yolk, if a ratio of lysophospholipids (which will hereinafter be called "lyso ratio") to the total phospholipids contained in the composition is 15% or greater in terms of a phosphorus amount.

In the present invention, there is thus provided an acid oil-in-water emulsified composition comprising an oil phase having a diglyceride content of 30% or greater and a yolk, wherein the lyso ratio is 15% or greater in terms of a phosphorus amount.

The reason why the above-described problems can be overcome by setting the lyso ratio at 15% or greater in terms of a phosphorus amount is not completely apparent but can be presumed as described below.

A yolk as an emulsifier is composed mainly of a lipoprotein which has a constituent lipid surrounded by a protein and a phospholipid. The polarity of the phospholipids differs from that of triglycerides but is closely akin to that of diglycerides. Accordingly, it is presumed that the phospholipids are sparingly soluble in an oil phase (emulsified particles) of a commercially available mayonnaise containing triglycerides, while the phospholipids of a mayonnaise containing diglycerides are inevitably dissolved in a diglycerides-containing oil phase. The yolk therefore loses its emulsifying power and/or emulsifying stability, causing flocculation and/or coalescence of particles and thereby cracks. The lysophospholipid-containing lipoprotein, on the other hand, is considered to become sparingly soluble in diglycerides owing to a change in the structure of the lipoprotein, thus preventing the generation of cracks.

BEST MODE FOR CARRYING OUT THE INVENTION

For an acid oil-in-water emulsified composition such as a mayonnaise or dressing type product, use of a low-melting-point oil or fat is preferred in order to prevent crystallization or solidification even if it is stored at low temperatures such as in a refrigerator. The diglycerides to be used in the present invention preferably have a low melting point. More specifically, a fatty acid residue constituting the diglycerides preferably has 8 to 24 carbon atoms, with 16 to 22 carbon atoms being particularly preferred. The amount of an unsaturated fatty acid residue is preferably 55% or greater, more preferably 70% or greater, particularly preferably 90% or greater, each based on the whole fatty acid residues. The diglycerides are available by an ester change reaction of a vegetable oil or animal oil with glycerin or esterification of a fatty acid derived from the above-described oil or fat with glycerin. As the reacting method, either one of chemical reaction in the presence of an alkali catalyst or biochemical reaction using fat hydrolases such as lipase can be employed. The diglyceride content in the oil phase of the acid oil-in-water emulsified composition according to the present invention is 30% or greater from the viewpoint of the availability of the composition as a lipid metabolism improving food (for inhibition of neutral fat accumulation), with 35% or greater being preferred. To the oil phase, triglycerides, monoglycerides, free fatty acids and/or the like can be incorporated as well as diglycerides. It is also possible to add a high-melting-point fat or oil, particularly, a fat or oil which takes the solid form at room temperature, to the oil phase in order to stabilize the emulsified composition.

The yolk to be used in the present invention may be in any form such as raw yolk, frozen yolk, powdered yolk, salt-added yolk or sugar-added yolk. The whole egg including the albumen can also be added. From the viewpoint of taste improvement, the yolk content in the composition is preferably 5 to 20%, more preferably 7 to 17%, particularly preferably 8 to 15%, most preferably 10 to 15%, each in terms of a liquid yolk.

To the water phase of the acid oil-in-water emulsified composition of the present invention, it is possible to add water; a vinegar such as rice flavored vinegar, sake cake vinegar, apple vinegar, wine vinegar, grain vinegar or synthetic vinegar; a salt; a seasoning such as sodium glutamate;

a saccharide such as sugar or thick malt syrup; a taste improver such as sake or sweet sake; vitamin; an organic acid such as citric acid, or salt thereof; a spice; a juice of a vegetable or fruit such as lemon juice; a thickened polysaccharide such as xanthan gum, gellan gum, guar gum, tamarind gum, carrageenan, pectin or tragacanth gum; a starch such as potato starch, decomposition product thereof, or processed starch thereof; an emulsifier, for example, synthetic emulsifier such as sucrose fatty acid ester, sorbitan fatty acid ester, polyglycerin fatty acid ester or polysorbate, protein emulsifier such as soybean protein, milk protein or wheat protein, or separated or decomposed product thereof, or a natural emulsifier such as lecithin or enzymolyzate thereof; a milk product such as milk; or a phosphate salt. In the present invention, such a substance can be added as needed, depending on the viscosity, physical properties or the like of a target composition.

From the viewpoint of a balance between taste and storage stability, such a water phase preferably has a pH of 2 to 6, with 3 to 5 being particularly preferred. The pH of the water phase can be adjusted with an acidulant such as the above-described vinegar, organic acid, salt of the organic acid or juice. The oil phase:water phase ratio (weight ratio) in the composition preferably ranges from 10 to 80:90 to 20, with 35 to 75:65 to 25 being particularly preferred.

The lyso ratio of the acid oil-in-water emulsified composition according to the present invention is required to be 15% or greater, preferably 25% or greater, more preferably 29 to 75%, particularly preferably 29 to 60% from the viewpoints of storage stability, appearance, taste and physical properties. The lysophospholipids are preferably derived partially or wholly from a yolk or soybean, with derivation from a yolk being particularly preferred.

Moreover, it is preferred that the lysophospholipids are partially or wholly an enzyme-treated yolk. As the enzyme used for enzymatic treatment of a yolk, preferred are esterase, lipase and phospholipase, of which the lipase and phospholipase are more preferred, with the phospholipase being particularly preferred. Among the phospholipase, phospholipase A, that is, phospholipase $A_1$ and/or $A_2$ is most preferred.

When only the enzyme-treated yolk is employed as the yolk, enzymatic treatment conditions are selected so as to provide the lyso ratio of 15% or greater. Described specifically, when an enzymatic activity is 10000 IU/mL, the enzyme is added in an amount of 0.001 to 2.0%, particularly, 0.05 to 2.0%, more preferably 0.1 to 1.0% based on the amount of the yolk. The reaction temperature is 10 to 60° C., with 20 to 50° C. being particularly preferred. The reaction time ranges from 10 minutes to 24 hours, with 15 to 60 minutes being particularly preferred. When the enzymatic treated yolk is used as a part of the yolk, on the other hand, the enzymatic treatment conditions may be selected so that the lyso ratio of the total of the yolk not treated with an enzyme and the enzyme-treated yolk falls within the above-described range. Such an enzymatic treatment is desired to be conducted prior to emulsification of mixed raw materials. After enzymatic treatment, it is preferred to inactivate the enzyme.

In the present invention, a phytosterol having serum cholesterol level lowering action can be incorporated further. Use of diglycerides and phytosterol in combination synergistically heightens the serum cholesterol level lowering action, thereby increasing the usefulness of the composition as a lipid metabolism improving food. Examples of the phytosterol include α-sitosterol, β-sitosterol, stigmasterol, ergosterol and campesterol. The fatty acid esters, ferulic acid esters or glucosides thereof can also be used. In the present invention, they can be used either singly or in combination. The phytosterol is preferably added in an amount of 1.2 to 10% based on the acid oil-in-water emulsified composition, with 2 to 5% being particularly preferred.

Examples of the acid oil-in-water emulsified composition according to the present invention include dressing, semisolid dressing, emulsified dressing, mayonnaise, salad dressing and French dressing as defined in Japan Agricultural Standards (JAS). It is not particularly limited to them, but corresponds to mayonnaise or dressing type products.

The acid oil-in-water emulsified composition according to the present invention can be prepared, for example, by the below-described process. An oil phase is first prepared by mixing oil components such as diglycerides and phytosterol. A water phase is then prepared by mixing a yolk and the other water-soluble raw materials. The oil phase is added to the water phase, followed by homogenization after preliminary emulsification if necessary, whereby an acid oil-in-water emulsified composition can be obtained. Examples of the homogenizer include a high-pressure homogenizer such as APV GAULIN or microfluidizer, ultrasonic emulsifier, colloid mill, agi-homomixer or milder. The acid oil-in-water emulsified composition according to the present invention can be used similarly to a commercially available mayonnaise.

EXAMPLES

Referential Examples 1 to 3

After 300 g of a yolk solution having a salt concentration of 10% and 100 g of water were mixed and preliminary heated sufficiently at a reaction temperature, phospholipase $A_2$ was added in an amount as shown in Table 1 based on the amount of the yolk solution, whereby an enzyme-modified yolk was obtained. The reaction time, reaction temperature and lyso ratio are shown in Table 1. The lyso ratio was calculated in accordance with the following method. First, the reaction mixture was extracted in repetition with a 3:1 chloroform and methanol mixed solvent to obtain all the lipids in the reaction mixture. The resulting lipid mixture was subjected to primary thin-layer chromatography with chloroform—methanol—water (65:25:49) and secondary thin-layer chromatography with butanol—acetic acid—water (60:20:20), whereby various phospholipids were obtained separately. The amount of each of the phospholipids thus obtained was calculated using a commercially available measuring kit (permanganate ashing method, Phospholipid-Test Wako, produced by Wako Purechemicals Co., Ltd.). The lyso ratio (%) was found from (total phosphorus amount in the lysophospholipids fraction/total phosphorus amount in the whole phospholipids)×100.

TABLE 1

| | Lyso ratio (%) | Phospholipase $A_2$[1] (%) | Temperature | Time |
|---|---|---|---|---|
| Referential Example 1 | 29 | 0.1 | 20° C. | 30 min |
| Referential Example 2 | 60 | 0.1 | 50° C. | 60 min |
| Referential Example 3 | 75 | 1.0 | 50° C. | 15 min |

[1]Enzymatic activity: 10,000 IU/mL

1) Enzymatic Activity: 10,000 IU/mL

Examples 1 to 6 and Comparative Examples 1 to 3

In each of Examples 1 to 6 and Comparative Examples 1 to 3, an oil phase and a water phase were prepared by a known method in accordance with the formulation as shown in Table 2. After preliminary emulsification by adding the oil phase to the water phase while stirring, the emulsified mixture was homogenized in a colloid mill (5000 rpm, clearance: 0.35 mm), whereby a mayonnaise having an average emulsified particle size of 2.5 to 3.5 μm was prepared.

Test 1

The mayonnaise obtained in each of Examples and Comparative Examples was stored at 20° C. for 6 months or at 40° C. for one month and its appearance, taste and physical properties were evaluated by a panel of 6 experts in accordance with the below-described standards. The results are shown in Table 2.

Evaluation Standards:
Appearance, physical properties, and taste
A: excellent
B: good
C: slightly poor
D: poor The mayonnaise according to Comparative Example 1 was a commercially available one containing, as an oil component, triglycerides in an amount not lower than 95% and diglycerides in an amount not greater than 2% and it was free from cracks during the storage at 20° C. for 6 months or at 40° C. for 1 month. It had gloss, appearance of fine texture and cream-like physical properties was excellent in taste. The mayonnaise obtained in each of Examples 1 to 6 was almost similar to that of Comparative Example 1 in storage stability, appearance, taste and physical properties. In the mayonnaise obtained in each of Comparative Examples 2 and 3, on the other hand, cracks appeared after storage at 20° C. for 1 month or at 40° C. for 1 week and water was separated from the cracks. It lacked gloss and had appearance of rough texture and gel-like physical properties. Comparative Example 3 indicates that addition of an enzyme-treated yolk deteriorates the storage stability of a mayonnaise free from diglycerides.

Examples 7 and 8

According to the formulation as shown in Table 3, a French dressing (Example 7) and a Thousand-island dressing (Example 8) were prepared. Described specifically, in each of Examples, a composition having a high diglyceride content and phytosterol were added dropwise to a water phase under stirring and they were emulsified preliminarily.

TABLE 2

|  |  | Examples |  |  |  |  |  | Comp. Ex. |  |  |
|---|---|---|---|---|---|---|---|---|---|---|
|  |  | 1 | 2 | 3 | 4 | 5 | 6 | 1 | 2 | 3 |
| Water phase | Purified salt | 0.30 | 0.30 | 0.30 | 0.30 | 0.30 | 0.30 | 0.30 | 0.30 | 0.30 |
|  | White sugar | 1.00 | 1.00 | 1.00 | 1.00 | 1.00 | 1.00 | 1.00 | 1.00 | 1.00 |
|  | Monosodium glutamate | 0.40 | 0.40 | 0.40 | 0.40 | 0.40 | 0.40 | 0.40 | 0.40 | 0.40 |
|  | Mustard powder | 0.20 | 0.20 | 0.20 | 0.20 | 0.20 | 0.20 | 0.20 | 0.20 | 0.20 |
|  | Thickener[1] | 0.20 | 0.20 | 0.20 | 0.20 | 0.20 | 0.20 | — | — | 0.20 |
|  | 10%-salt-added yolk | — | — | — | 7.50 | — | — | 15.00 | 15.00 | — |
|  | Yolk of Ref. Ex. 1 | 15.00 | — | — | — | — | — | — | — | — |
|  | Yolk of Ref. Ex. 2 | — | 15.00 | — | — | 15.00 | 14.00 | — | — | 15.00 |
|  | Yolk of Ref. Ex. 3 | — | — | 15.00 | 7.50 | — | — | — | — | — |
|  | Soybean protein[2] | — | — | — | — | — | 1.00 | — | — | — |
|  | 10% brewed vinegar | 6.00 | 6.00 | 6.00 | 6.00 | 6.00 | 6.00 | 6.00 | 6.00 | 6.00 |
|  | Water | 6.90 | 6.90 | 6.90 | 6.90 | 4.20 | 6.90 | 7.10 | 7.10 | 6.90 |
| Oil phase | Composition of a high diglyceride content[3] | 70.0 | 70.0 | 70.0 | 70.0 | 70.0 | 70.0 | — | 70.0 | — |
|  | Refined soybean oil[4] | — | — | — | — | — | — | 70.0 | — | 70.0 |
|  | Phytosterol[5] | — | — | — | — | 2.70 | — | — | — | — |
| Evaluation | Appearance | B | A | A | A | A | A | A | D | D |
|  | Physical properties | A | A | A | A | A | A | A | D | D |
|  | Yolk taste | A | A | B | A | B | B | A | A | B |

Each numeral is followed by % as a unit.
1): Xanthan gum, product of Dainippon Pharmaceutical Co., Ltd.
2): "Ajipron CX", trade name; product of Ajinomoto Co., Inc.
3): prepared by the enzymatic reaction between soybean oil fatty acid and glycerin
   MG; 0.8%, DG: 88.7%, TG: 10.5%
   Fatty acid composition
   $C_{16:0}$: 2.6%, $C_{18:0}$: 0.8%, $C_{18:1}$: 28.4%%, $C_{18:2}$: 59.7%, $C_{18:3}$: 6.9%, $C_{20:0}$: 1.2%
4): containing 95% or greater of TG and not greater than 2% of DG
5): "Phytosterol PHS-P", trade name; product of Tama Biochemical Co., Ltd.

The resulting emulsion was homogenized in a homomixer, whereby a dressing having an average emulsified particle size of 4 to 7 μm was obtained. The dressing was evaluated by a panel of 6 experts. As a result, it was almost similar, in appearance, taste, feeling upon eating and physical properties, to a dressing obtained using an ordinarily-employed oil or fat.

TABLE 3

|  |  | Example 7 | Example 8 |
|---|---|---|---|
| Water phase | Brewed vinegar (about 5% acidity) | 14 | 14 |
|  | White sugar | 5 | 5 |
|  | Salt | 3 | 2 |

TABLE 3-continued

|  |  | Example 7 | Example 8 |
|---|---|---|---|
|  | Lemon juice | 2 | 2 |
|  | Spice | 1 | 0.4 |
|  | Seasoning | 0.5 | 0.5 |
|  | Thickener | 0.6 | 0.4 |
|  | Yolk of Example 2 | 2 | 4 |
|  | Tomato ketchup |  | 5 |
|  | Pickles |  | 4 |
|  | Tomato paste |  | 1 |
|  | Water | Balance | Balance |
| Oil phase | Composition of high diglyceride content[1] | 40 | 35 |
|  | Phytosterol[2] | 2.7 | 2.7 |

Each numeral is followed by % as a unit.
[1]similar to Example 1
[2]similar to Example 5

INDUSTRIAL APPLICABILITY

The oil-in-water emulsified composition according to the present invention is free from cracks or water separation during storage, has gloss, appearance of fine texture and cream-like physical properties and at the same time, is excellent in taste even if it contains diglycerides in a high concentration. It is particularly useful as a lipid metabolism improving food.

The invention claimed is:

1. A method for preparing a food composition comprising:
    a) mixing an oil phase comprising a diglyceride, a phystosterol, a phystosterol ester, a water phase comprising a yolk, an enzyme-treated yolk, or a mixture thereof, to form an emulsion; and
    b) homogenizing the emulsion to form the food composition,
    wherein the emulsion has a percentage of lysophospholipids to total phospholipids of at least 25% in terms of a phosphorus amount.

2. The method according to claim 1, wherein the food composition comprises a dressing.

3. The method according to claim 2, wherein the dressing is selected from the group consisting of a semi-solid dressing, emulsified dressing, salad dressing and French dressing.

4. The method according to claim 1, wherein the food composition comprises a mayonnaise.

5. The method according to claim 1, further comprising: adding at least one member selected from the group consisting of a spice, vinegar, salt and seasoning, to the emulsion.

6. The method according to claim 1, further comprising adjusting the pH of the emulsion of from 2 to 6.

7. The method according to claim 1, further comprising adjusting the pH of the emulsion of from 3 to 5.

8. The method according to claim 1, wherein the lysophospholipids are derived partially from or wholly from a yolk.

9. The method according to claim 1, wherein the lysophospholipids are derived partially from or wholly from an enzyme-treated yolk.

10. The method according to claim 1, further comprising treating the enzyme-treated yolk with an enzyme selected from at least one member from the group consisting of esterase, lipase and phospholipase A.

11. The method according to claim 1, wherein the phytosterol is at least one member selected from the group consisting of α-sitosterol, β-sitosterol, stigmasterol, ergosterol and campesterol.

12. The method according to claim 1, wherein the phytosterol is present in a quantity of from 1.2 to 10%.

13. The method according to claim 1, wherein the lysophospholipids are derived partially from or wholly from soybean.

14. The method according to claim 1, wherein the emulsion has an oil/water ratio of from 10/90 to 80/20.

15. The method according to claim 1, wherein the emulsion has an oil/water ratio of from 35/65 to 75/25.

16. The method according to claim 1, wherein the lysophospholipids are derived from partially or wholly from yolk.

17. The method according to claim 1, wherein the lysophospholipids are derived from partially or wholly from enzyme-treated yolk.

18. The method according to claim 1, wherein the enzyme-treated yolk is treated with an enzyme selected from the group consisting of esterase, lipase and phospholipase A.

19. The method of claim 1, wherein a diglyceride content in said oil phase is 30% or greater.

20. The method of claim 1, wherein a diglyceride content in said oil phase is 35% or greater.

21. A method for improving lipid metabolism of a mammal comprising:
    (a) mixing an oil phase comprising diglycerides, phystosterol and a water phase comprising a yolk, an enzyme-treated yolk, or a mixture thereof, to form an emulsion; and
    (b) administering the emulsion to a mammal,
    wherein the emulsion has a percentage of lysophospholipids to total phospholipids of at least 25% in terms of a phosphorus amount and the improved metabolism of the mammal is improved relative to the level of metabolism in the absence of administering the emulsion.

22. A method for lowering serum cholesterol level of a mammal comprising:
    (a) mixing an oil phase comprising diglycerides, phystosterol and a water phase comprising a yolk, enzyme-treated yolk, or a mixture thereof, to form an emulsion; and
    (b) administering the emulsion to a mammal,
    wherein the emulsion has a percentage of lysophospholipids to total phospholipids of at least 25% in terms of a phosphorus amount and the serum cholesterol level of the mammal is lowered relative to the serum cholesterol level in the absence of administering the emulsion.

* * * * *